(12) United States Patent
Alaze

(10) Patent No.: US 6,641,232 B1
(45) Date of Patent: *Nov. 4, 2003

(54) PISTON PUMP FOR BRAKE SYSTEM WITH PISTON PUMP

(75) Inventor: Norbert Alaze, Markgroeningen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 91 days.

(21) Appl. No.: 09/272,772

(22) Filed: Mar. 19, 1999

(30) Foreign Application Priority Data

Mar. 26, 1998 (DE) .......................... 198 13 302

(51) Int. Cl.[7] .............................. B60T 8/40; F04B 39/10
(52) U.S. Cl. ..................................... 303/116.4; 417/536
(58) Field of Search .......................... 303/116.1, 116.4, 303/116.3; 417/536, 534, 535, 538, 250

(56) References Cited

U.S. PATENT DOCUMENTS

| | | |
|---|---|---|
| 1,762,625 A | 6/1930 | Holt |
| 4,875,741 A | 10/1989 | Ozawa et al. |
| 4,977,606 A * | 12/1990 | Budecker ................... 417/538 |
| 4,983,100 A | 1/1991 | Budecker |
| 5,078,458 A * | 1/1992 | Budecker et al. ......... 303/116.4 |
| 5,213,482 A * | 5/1993 | Reinartz et al. .......... 303/116.4 |
| 5,573,386 A * | 11/1996 | Schmitt et al. .......... 303/116.4 |
| 5,915,927 A * | 6/1999 | Kuromitsu ................. 417/250 |
| 6,079,796 A * | 6/2000 | Schmidt et al. .......... 303/116.1 |

FOREIGN PATENT DOCUMENTS

| | | | |
|---|---|---|---|
| DE | 3840691 C2 | 12/1988 | |
| DE | 4102364 A1 | 1/1991 | |
| DE | 4102364 | 7/1992 | |
| DE | 19738524 A1 | 9/1997 | |
| DE | 19738524 | 3/1998 | |
| JP | 1-297349 | * 11/1989 | .............. 303/116.4 |
| JP | 9309428 | 2/1997 | |
| WO | WO-97/43152 | * 11/1997 | |

* cited by examiner

*Primary Examiner*—Jack Lavinder
*Assistant Examiner*—T. Williams
(74) *Attorney, Agent, or Firm*—Ronald E. Greigg

(57) ABSTRACT

A pump for a brake system in which the pump includes two pump pistons driven by a motor. Each pump piston feeds the brake fluid both during a retraction stroke and during an extension stroke, and a relatively uniform feed flow is thereby attainable by a fluid output from the piston being driven in both directions. The piston pump is intended for slip-controlled vehicle brake systems in motor vehicles.

20 Claims, 3 Drawing Sheets

PISTON PUMP FOR BRAKE SYSTEM WITH PISTON PUMP

BACKGROUND OF THE INVENTION

The invention is based on a piston pump and a brake system having a piston pump.

The piston pump is intended in particular as a pump in a brake system of a vehicle and is used for controlling the pressure in the wheel brake cylinders. Depending on the type of brake system, the abbreviations ABS, ASR, FDR and EHB are used for such brake systems. In the brake system, the pump serves for instance to return brake fluid from one or more wheel brake cylinders to a master cylinder (ABS) and/or to pump brake fluid out of a supply container into one or more wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With wheel slip control (ABS or ASR), for instance, locking of the wheels of the vehicle during a braking event involving strong pressure on the brake pedal (ABS) and/or spinning of the driven wheels of the vehicle in the event of strong pressure on the gas pedal (ASR) can be prevented. In a brake system serving as a steering aid (FDR), a brake pressure is built up in one or more wheel brake cylinders independently of an actuation of the brake pedal or gas pedal, for instance to prevent the vehicle from shifting out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

What is important is that in the brake system, the pressure in the individual brake cylinders can be controlled independently of the pressure in the other brake cylinders. Therefore in a vehicle with four brake cylinders, typically piston pumps are provided in which each of the brake cylinders is assigned its own pump element each with one pump piston. Along with this, U.S. Pat. No 4,875,741 shows a brake system in which two brake cylinders are connected to one pump element. However, so that the pressure medium cannot overflow unintentionally from one of the brake cylinders into the other brake cylinder in this version, a pump element with two work pressure chambers is used here. One of the two work pressure chambers is located on the face end on the pump piston, and the other work pressure chamber is formed as an annular chamber by providing the pump piston with a shoulder. In the brake system shown in U.S. Pat. No. 4,875,741, one inlet-side check valve and one outlet-side check valve is provided in the piston pump for each of the brake cylinders. While the pump piston is forced into the housing of the piston pump by the eccentric element, the pressure medium is forced out of the face-end work pressure chamber and at the same time out of the annular work pressure chamber into an outlet connection, each via a respective outlet valve. When the pump piston then moves out of the housing again, both work pressure chambers increase in size, and the pump element aspirates the pressure medium into both work pressure chambers. As a result, the pump operates very unevenly, creating major pressure pulsations and hence is very noisy.

OBJECT AND SUMMARY OF THE INVENTION

The piston pump of the invention and the brake system set forth have the advantage over the prior art that upon motion of the pump piston, the feeding of the pressure medium from the two work pressure chambers is done in phase-offset fashion, thus making the pumping of pressure medium substantially more uniform, which leads to a considerable reduction in noise. Because feeding is more uniform, the maximum flow speed of the pressure medium is also less, and as a result the efficiency of the piston pump is improved, or else smaller line cross sections can be selected.

For safety reasons, two brake circuits are often provided in brake systems. For safety reasons, it is important that the two brake circuits be cleanly separated from one another. One substantial advantage of the piston pump proposed is that the individual brake circuits of the vehicle brake system can be cleanly separated from one another.

One particular advantage is that the feed flow can be made more uniform despite low effort and expense for drilling inside the housing of the piston pump.

Advantageous refinements of and improvements to the piston pump and the brake system are possible with the provisions recited hereinafter.

If the transmission mechanism or the eccentric element between the drive motor and the pump piston is embodied such that compressive and tensile forces can be transmitted by the drive motor to the outlet connection, this offers the advantage of being able to dispense with a large-sized spring to restore the pump piston.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
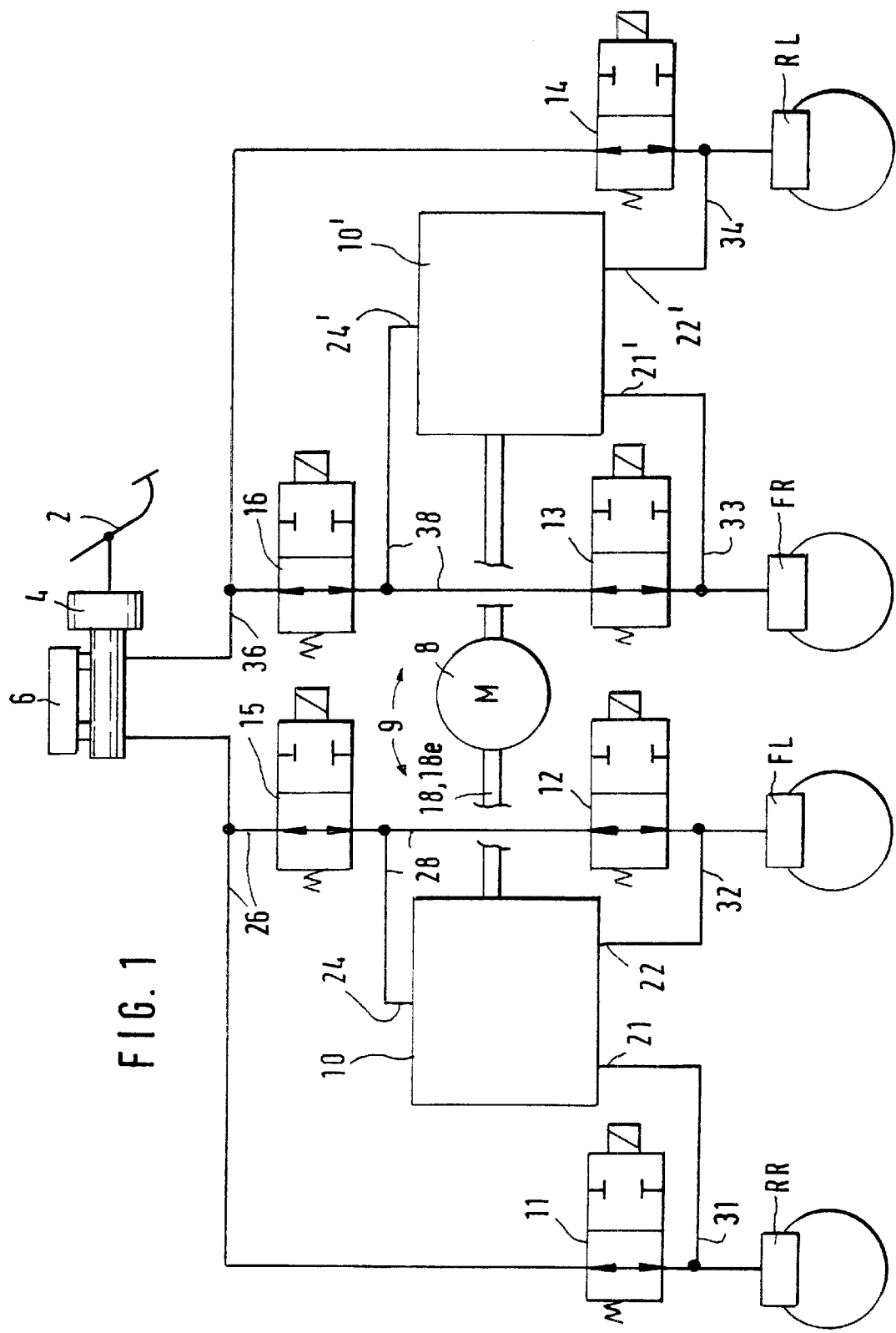
FIG. 1 shows a brake system with a piston pump embodied according to the invention.

FIG. 1 symbolically and as an example shows a preferably selected vehicle brake system of a motor vehicle with four wheels, assuming that the two front wheels, for instance, can be driven by a driving engine, not shown, and the two rear wheels can be non-driven. In symbolic form, the drawing shows a right rear wheel with a brake cylinder RR represented by a rectangle, a left front wheel with a brake cylinder FL, a right front wheel with a brake cylinder FR, and a left rear wheel with a brake cylinder RL. Also shown symbolically are a brake pedal 2, a master cylinder 4, a tank 6 containing a pressure medium, preferably brake fluid, a drive motor 8, a piston pump 9, a first blocking valve 11, a second blocking valve 12, a third blocking valve 13, a fourth blocking valve 14, a fifth blocking valve 15, and a sixth blocking valve 16. The blocking valves 11, 12, 13, 14, 15, 16 are electrically controllable. The drive motor 8 is an electric motor. The electric lines leading to the blocking valves 11, 12, 13, 14, 15, 16 and to the drive motor 8 have not been shown in the drawing, for the sake of simplicity. The piston pump 9 includes a first pump element 10 and a second pump element 10'. With the aid of a mechanical transmission mechanism 18, symbolically represented by a double line in FIG. 1, the drive output generated by the electric drive motor 8 can be transmitted by the pump elements 10, 10'; in the exemplary embodiment selected, the mechanical transmission mechanism 18 is an eccentric element 18e that can be driven to rotate by the drive motor 8.

The first pump element 10 has a first inlet connection 21, a second inlet connection 22, and an outlet connection 24. The second pump element 10' likewise has a first inlet connection 21', a second inlet connection 22', and an outlet connection 24'. The preferably selected piston pump 9 thus has a total of four inlet connections 21, 22, 21', 22', and two outlet connections 24, 24'.

One line 26 connects the master cylinder 4 to the blocking valve 11 and the blocking valve 15; one line 28 connects the outlet connection 24 of the pump element 10 to the two blocking valves 12 and 15; one line 31 connects the first inlet connection 21 of the piston pump element 10 to the blocking valve 11 and to the brake cylinder RR of the right rear wheel; one line 32 connects the second inlet connection 22 of the piston pump element 10 to the blocking valve 12 and to the brake cylinder FL of the left front wheel; one line 33 connects the second inlet connection 21' to the pump element 10' and to the blocking valve 13 and to the brake cylinder FR of the right front wheel; one line 34 connects the second inlet connection 22' to the pump element 10' and to the blocking valve 14 and to the brake cylinder RL of the left rear wheel; one line 36 connects the master cylinder 4 to the 25 blocking valve 14 and to the blocking valve 16; and one line 38 connects the outlet connection 24' of the piston pump element 10' to the blocking valve 13 and the blocking valve 16. The lines 26, 28, 31, 32, 33, 34, 36, 38 are hydraulic pipes or hoses that contain the pressure medium, such as brake fluid.

Via the brake pedal 2, brake pressure can be built up in the brake cylinders RR, FL, FR, RL. In a departure from the brake pressure specified via the brake pedal 2, the pressure in the brake cylinders RR, FL, FR, RL can be reduced or built up with the aid of the piston pump 9. For instance, if the brake pedal 2 is actuated too forcefully, then with the aid of a controller, not shown, the blocking valves 11, 12 are controlled all the way or partway into their blocking position, and the piston pump 9 pumps pressure medium out of the lines 31, 32, through the line 28, and through the opened blocking valve 15 into the tank 6. As a result, the pressure in the brake cylinders RR, FL drops. By opening the blocking valves 11 and/or 12 to a variable width, the brake pressure in each of the brake cylinders RR, FL can be lowered independently of the brake pressure in the other brake cylinder RR or FL. It is important in this respect that the pressure medium cannot overflow uncontrolled out of one of the brake cylinders RR, FL into the respective other brake cylinder RR or FL, not even via the lines 31 and 32.

If a brake pressure is to be built up in the brake cylinder FL of the left front wheel while the brake pedal 2 is not actuated, the control unit, not shown, then moves the blocking valve 15 into the blocking position, and the pump element 10 of the piston pump 9 pumps pressure medium out of the tank 6, through the line 26, through the opened blocking valve 11, through the line 31, via the inlet connection 21, through the pump element 10, via the outlet connection 24, through the line 28, and through the opened blocking valve 12 to the brake cylinder FL of the left front wheel. The pump element 10 in the process also pumps pressure medium out of the line 32, via the inlet connection 22, via the outlet connection 24 and through the line 28 back into the line 32, so that this short-circuited flow course does not change the pressure. So that the pressure medium cannot flow unintended out of the brake cylinder FL of the left front wheel, which cylinder is at high pressure, into the brake cylinder RR of the right rear wheel, which cylinder is at low pressure, it is important that no pressure medium can flow out of the line 32 into the line 31, and this includes that it cannot flow inside the pump element 10. The piston pump 9 must be constructed accordingly.

The piston pump 9 selected as an example includes the pump element 10 and the pump element 10'. The pump element 10 is connected to the brake cylinders RR and FL. Correspondingly, the brake cylinders FR and RL are connected to the pump element 10'. The pump element 10' is substantially identically embodied to the pump element 10, and the ensuing explanation will therefore be limited primarily to the pump element 10.

So that the first brake circuit, including the brake cylinders RR and FL and the first pump element 10, will be cleanly separated from the second brake circuit that includes the brake cylinders FR and RL and the second pump element 10', care must be taken that the two brake circuits are securely separated from one another under all circumstances, including inside the piston pump 9. The piston pump 9 must therefore be constructed such that even if a seal inside the piston pump 9 might eventually fail, the pressure medium cannot be exchanged between the two pump elements 10, 10'.

Figure 2:
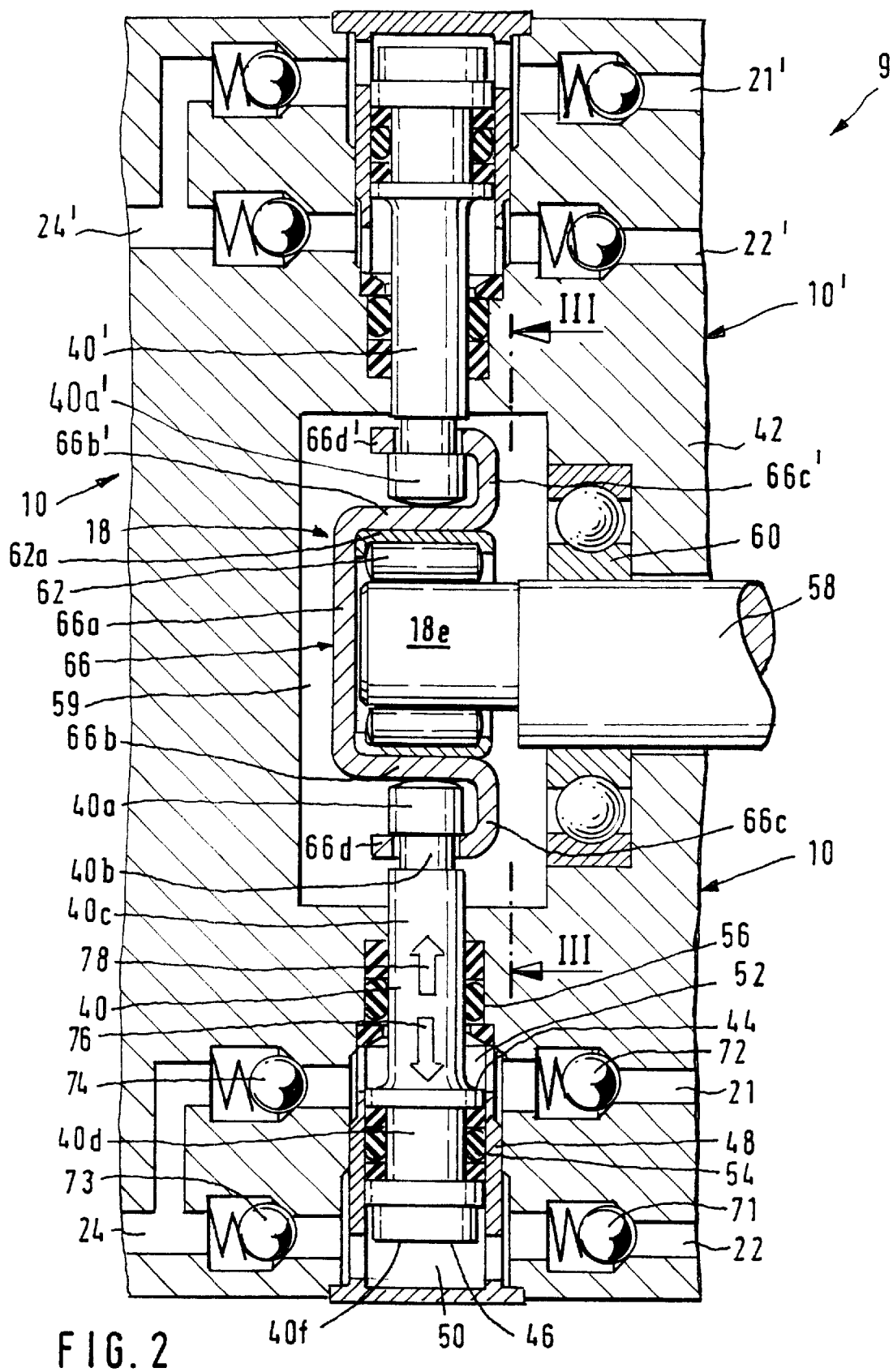
FIGS. 2 and 3 show different views and details of the exemplary embodiment.
Figure 3:
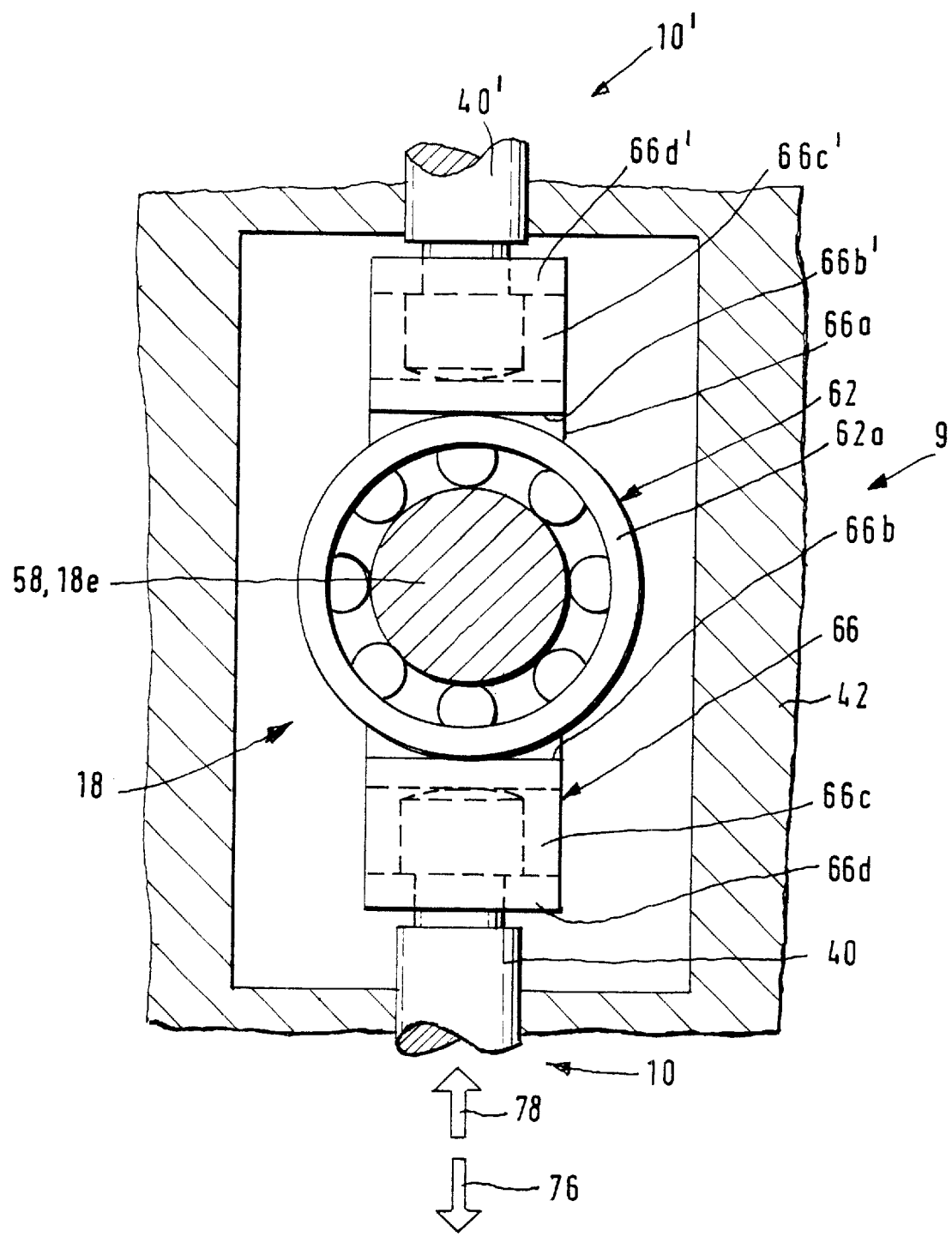

FIGS. 2 and 3 by way of example show a preferably selected version of the piston pump 9. FIG. 2 shows a section through the piston pump 9 in the plane in which the pump pistons 40, 40' and the drive shaft 58 are located. FIG. 3 shows a fragmentary section through the piston pump 9 in the direction marked III in FIG. 2.

In all the drawings, elements that are the same or function the same are provided with the same reference numerals.

The pump element 10 has a pump piston 40, and the pump element 10' has a pump piston 40'. The pump piston 40 is in the extended position in FIGS. 2 and 3, and the pump piston 40' is in the retracted position in FIGS. 2 and 3. In FIGS. 2 and 3, a detail of a hydraulic block acting as a housing 42 is shown in section. Both pump pistons 40, 40' and the blocking valves 11, 12, 13, 14, 15, 16 can all be integrated in the hydraulic block or housing 42. The drive motor 8 (FIG. 1) is preferably flanged to the housing 42. The two pump pistons 40 and 40' are supported displaceably in the housing 42. The pump piston 40 has an end 40a toward the eccentric element 18e, and also has a guide region 40c, a largest-diameter region 40d, and a face end 40f remote from the eccentric element 18e. There is a constriction 40b between the end 40a, toward the eccentric element, and the guide region 40c.

Because the diameter of the guide region 40c is less than the hydraulically effective diameter of the region 40d, a hydraulically effective annular face 44 is formed on the face end, at the transition from the guide region 40c to the region 40d. The largest-diameter region 40d forms a hydraulically effective end face 46 on the face end 40f. A guide bush 48 closed off from the outside is press-fitted tightly and firmly into the housing 42. A first work pressure chamber 50 is formed between the end face 46 and the guide bush 48; a second work pressure chamber 52 is formed between the annular face 44 and the guide bush 48. The largest-diameter region 40d of the pump piston 40 is located between the first work pressure chamber 50 and the second work pressure chamber 52. A sealing and guide ring 54 comprising a plurality of individual rings are at the circumference of the largest-diameter region 40d. The sealing and guide ring 54 serves the purpose of sliding guidance of the largest-diameter region 40d of the pump piston 40 in the guide bush 48 and of sealing off the two work pressure chambers 50 and 52 from one another. A further sealing and guide ring 56 is provided in the housing 42. The sealing and guide ring 56 serves the purpose of sliding guidance of the guide region 40c of the pump piston 40 and of sealing off the second work pressure chamber 52 from a hollow chamber 59 in the housing 42. The eccentric element 18e is located in the hollow chamber 59.

From the drive motor 8 (FIG. 1), a drive shaft 58 leads into the housing 42 (FIG. 2). The drive shaft 58 is rotatably supported in the housing 42 via a bearing 60. A journal provided eccentrically to the pivot axis of the drive shaft 58 is located on the drive shaft 58. The journal forms the eccentric element 18e. An eccentric bearing 62 is located on the journal. The eccentric bearing 62 is a roller bearing, with an outer ring 62a and with roller bodies that roll between the outer ring 62a and the eccentric journal. By way of example, the eccentric bearing 62 is a needle bearing with needlelike cylindrical pins as roller bodies.

The outer ring 62a of the eccentric bearing 62 is in engagement with a clamp 66. By way of example, the clamp 66 is formed by bending a stable steel band multiple times. The clamp 66 has a middle region 66a, an axial region 66b, an axial region 66b', two radial regions 66c and 66c', and two retaining regions 66d and 66d'. With respect to the longitudinal axis of the drive shaft 58, the axial regions 66b, 66b' and the retaining regions 66d, 66d' all extend axially, while the middle region 66a and the radial regions 66c, 66c' extend radially. The axial region 66b, the radial region 66c and the retaining region 66d are located on the side of the eccentric bearing 62 toward the pump piston 40; the axial region 66b', the radial region 66c' and the retaining region 66d' are located on the side of the eccentric bearing 62 toward the pump piston 40'.

An inlet valve 71 allows a flow of pressure medium out of the inlet connection 22 into the first work pressure chamber 50; an outlet valve 73 allows a flow of pressure medium out of the first work pressure chamber 50 into the outlet connection 24; an inlet valve 72 allows a flow of pressure medium from the inlet connection 21 into the second work pressure chamber is 52; an outlet valve 74 allows a flow of pressure medium out of the second work pressure chamber 52 into the outlet connection 24. The valves 71, 72, 73, 74, embodied as check valves, prevent a flow in the reverse direction.

The drive motor 8 can drive the pump piston 40 into the housing 42 (downward motion, in terms of FIGS. 2 and 3) and retrieve it (upward motion, in terms of FIGS. 2 and 3), by rotation of the drive shaft 58 via the eccentric element 18e, the eccentric bearing 62 and the clamp 66. When the pump piston 40 is driven into the housing 42, the pump piston 40 moves in the first direction of motion 76, marked by an arrow 76 in FIGS. 2 and 3. The direction opposite the first direction of motion 76 will be referred to hereinafter as the second direction of motion 78.

Upon motion of the pump piston 40 in the first direction of motion 76, the first work pressure chamber 50 decreases in size, and at the same time the second work pressure chamber 52 increases in size. In the process, pressure medium is forced out of the first work pressure chamber 50 through the outlet valve 73 into the outlet connection 24, and at the same time pressure medium is aspirated from the inlet connection 21 into the work pressure chamber 52 through the inlet valve 72. Upon an opposite motion, that is, when the pump piston 40 is driven in the second direction of motion 78, the first work pressure chamber 50 increases in size, and at the same time the second work pressure chamber 52 is reduced in size. In the process, the pressure medium is aspirated from the inlet connection 22 into the work pressure chamber 50 by the inlet valve 71, and at the same time pressure medium is forced out of the second work pressure chamber 52 into the outlet connection 24 by the outlet valve 74.

It is accordingly apparent that when the pump piston 40 is actuated in the first direction of motion 76 and when the pump piston 40 is actuated in the second direction of motion 78, pressure medium is aspirated and pumped into the outlet connection 24. Because as a result pumping is done relatively uniformly with one pump piston 40, the speed of change in the flow velocity of the pressure medium pumped into the outlet connection 24 is relatively slight, which is advantageously expressed in only relatively slight noise development.

In the exemplary embodiment shown, the eccentric element 18e, eccentric bearing 62 and clamp 66 are part of the transmission mechanism 18, with which both compressive forces and tensile forces can be transmitted from the drive shaft 58, driven by the drive motor 8, to the pump piston 40 and the pump piston 40'. Upon a rotation of the drive shaft 58 in a particular first rotational angle range, pressure is exerted on the end 40a toward the eccentric element of the pump piston 40 by the drive shaft 58, via the eccentric element 18e, eccentric bearing 62, outer ring 62a, and axial region 66b, and the pump piston 40 is driven in the first direction of motion 76; at the same time, the retaining region 66d' of the clamp 66 on the pump piston 40' engages the end 40a' of the second pump piston 40' toward the eccentric element. Upon further rotation of the drive shaft 58 over a second rotational angle range, the clamp 66 is driven in the second direction of motion 78 by the drive shaft 58, via the eccentric element 18e, eccentric bearing 62, and outer ring 62a, which is transmitted for the clamp 66 as tensile force to the pump piston 40 by the axial region 66b' and via the middle region 66a, axial region 66b, radial region 66c and retaining region 66d. As a result, compressive forces and tensile forces can be transmitted from the drive shaft 58 to the pump piston 40 via the eccentric element 18e.

As explained in terms of FIG. 1, the inlet connection 22 is connected to the brake cylinder FL of the left front wheel, and the inlet connection 21 is connected to the brake cylinder RR of the right rear wheel. Typically, more pressure medium must be fed from or to the brake cylinder of a front wheel than from or to the brake cylinder of a rear wheel. For this reason, the front wheel is connected to the first work pressure chamber 50, which has the larger cross-sectional area, and the rear wheel is connected to the second work pressure chamber 52, which has the smaller cross-sectional area. As a result, it is desirably obtained that upon each stroke of the pump piston 40, more pressure medium is aspirated from the inlet connection 22 connected to the front wheel than from the inlet connection 21 connected to the rear wheel.

The foregoing relates to a preferred exemplary embodiment of the invention, it being understood that other variants and embodiments thereof are possible within the spirit and scope of the invention, the latter being defined by the appended claims.

I claim:

1. A slip-controlled vehicle brake system with a piston pump comprising at least one pump piston (40), drivable by a drive motor in a housing in a first direction of motion (76), wherein the pump piston (40) in its motion in the first direction of motion (76) reduces a size of a first work pressure chamber (50) in the housing, and upon a motion in a second direction of motion (78) opposite the first direction of motion (76) the pump piston (40) increases the size of the first work pressure chamber (50), the pump piston (40), in its motion in the first direction of motion (76), increases the size of a second work pressure chamber (52) in the housing (42), and upon its motion in the second direction of motion (78) the pump piston (40) reduces the size of the second work pressure chamber (52), wherein an inlet (22) to the first pressure chamber (50) is connected to a brake cylinder (FL) of a front brake of a vehicle, and an inlet (21) to the second pressure chamber (52) is connected to a brake cylinder (RR) of a rear brake of the vehicle.

2. The piston pump according to claim 1, in which the pump piston (40) is driven by the drive motor (8) in the second direction of motion (78).

3. The piston pump according to claim 1, in which the drive motor (8) drives the at least one pump piston (40) via a transmission mechanism (18), and compression forces and tensile forces are transmitted to the pump piston (40) by the drive motor (8) via the transmission mechanism (18).

4. The piston pump according to claim 2, in which the drive motor (8) drives the at least one pump piston (40) via a transmission mechanism (18), and compression forces and tensile forces are transmitted to the pump piston (40) by the drive motor (8) via the transmission mechanism (18).

5. The piston pump according to claim 1, in which the drive motor (8) drives the at least one pump piston (40) via an eccentric element (18e), and compressive forces and tensile forces are transmitted to the pump piston (40) by the drive motor (8) via the eccentric element (18e).

6. The piston pump according to claim 2, in which the drive motor (8) drives the at least one pump piston (40) via an eccentric element (18e), and compressive forces and tensile forces are transmitted to the pump piston (40) by the drive motor (8) via the eccentric element (18e).

7. The piston pump according to claim 3, in which a clamp (66) that transmits the tensile forces from a drive shaft (58) drivable by the drive motor (8) to the at least one pump piston (40) is provided.

8. The piston pump according to claim 4, in which a clamp (66) that transmits the tensile forces from a drive shaft (58) drivable by the drive motor (8) to the at least one pump piston (40) is provided.

9. The piston pump according to claim 5, in which a clamp (66) that transmits the tensile forces from a drive shaft (58) drivable by the drive motor (8) to the at least one pump piston (40) is provided.

10. The piston pump according to claim 6, in which a clamp (66) that transmits the tensile forces from a drive shaft (58) drivable by the drive motor (8) to the at least one pump piston (40) is provided.

11. The piston pump according to claim 1, in which the pump piston (40) has a largest-diameter region (40d), and the largest-diameter region is located between the first work pressure chamber (50) and the second work pressure chamber (52).

12. The piston pump according to claim 2, in which the pump piston (40) has a largest-diameter region (40d), and the largest-diameter region is located between the first work pressure chamber (50) and the second work pressure chamber (52).

13. The piston pump according to claim 3, in which the pump piston (40) has a largest-diameter region (40d), and the largest-diameter region is located between the first work pressure chamber (50) and the second work pressure chamber (52).

14. The piston pump according to claim 5, in which the pump piston (40) has a largest-diameter region (40d), and the largest-diameter region is located between the first work pressure chamber (50) and the second work pressure chamber (52).

15. A slip-controlled vehicle brake system with a piston pump as in claim 1, wherein the inlet (22) to the first pressure chamber (50) is connected to a first control valve (12) which controls the brake cylinder (FL) of the front brake of the vehicle, and an inlet (21) to the second pressure chamber (52) is connected to a second control valve (11) which controls the brake cylinder (RR) of the rear brake of the vehicle.

16. The piston pump according to claim 1, in which at least one second pump piston (40') is provided.

17. The piston pump according to claim 2, in which at least one second pump piston (40') is provided.

18. The piston pump according to claim 3, in which at least one second pump piston (40') is provided.

19. A slip-controlled vehicle brake system with a piston pump as in claim 15, wherein the brake system has a master cylinder (4), the first control valve (12) controls the pressure in the cylinder (FL) of the front brake, and communicates with the master cylinder (4) via a line (26, 28), in the line (26, 28), between the master cylinder (4) and the first control valve (12), there is a flow control valve (15), the piston pump (10) has an outlet connection (24), the outlet connection (24) is connected to the line (28) between the flow control valve (15) and the first control valve (12).

20. A slip-controlled vehicle brake system with a piston pump as in claim 1, wherein the brake system has a master cylinder (4), a first control valve (12) controls the pressure in the cylinder (FL) of the front brake, and communicates with the master cylinder (4) via a line (26, 28), in the line (26, 28), between the master cylinder (4) and the first control valve (12), there is a flow control valve (15), the piston pump (10) has an outlet connection (24), the outlet connection (24) is connected to the line (28) between the flow control valve (15) and the first control valve (12).

* * * * *